(12) United States Patent
Zhamu et al.

(10) Patent No.: US 11,267,711 B2
(45) Date of Patent: Mar. 8, 2022

(54) PRODUCTION OF GRAPHITIC FILMS DIRECTLY FROM HIGHLY AROMATIC MOLECULES

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 92 days.

(21) Appl. No.: 16/361,748

(22) Filed: Mar. 22, 2019

(65) Prior Publication Data
US 2020/0299138 A1    Sep. 24, 2020

(51) Int. Cl.
*C01B 32/205*    (2017.01)
*C04B 35/524*    (2006.01)
*C01B 32/184*    (2017.01)

(52) U.S. Cl.
CPC .......... *C01B 32/205* (2017.08); *C01B 32/184* (2017.08); *C04B 35/524* (2013.01); *C01P 2002/60* (2013.01); *C01P 2002/76* (2013.01); *C01P 2006/10* (2013.01); *C01P 2006/32* (2013.01); *C01P 2006/40* (2013.01)

(58) Field of Classification Search
CPC ............................ C04B 35/522; C01B 22/184
See application file for complete search history.

(56) References Cited

U.S. PATENT DOCUMENTS

| 2,798,878 | A  | 7/1957  | Hummers         |
| 6,872,330 | B2 | 3/2005  | Mack et al.     |
| 7,071,258 | B1 | 7/2006  | Jang et al.     |
| 7,327,000 | B2 | 2/2008  | DeHeer et al.   |
| 7,758,842 | B2 | 7/2010  | Nishikawa et al.|
| 8,105,565 | B2 | 1/2012  | Nishikawa et al.|
| 8,883,114 | B2 | 11/2014 | Zhamu et al.    |

(Continued)

OTHER PUBLICATIONS

Anderson et al., "The Use of Esters of N-Hydroxysuccinimide in Peptide Synthesis" J. Amer. Chem. Soc. (1964) vol. 86, No. 9, pp. 1839-1842.

(Continued)

*Primary Examiner* — Robert A Vetere

(57) ABSTRACT

Provided is a method of producing a graphitic film, comprising: (a) providing a suspension of aromatic molecules selected from petroleum heavy oil or pitch, coal tar pitch, a polynuclear hydrocarbon, a halogenated variant thereof, or a combination thereof, dispersed or dissolved in a liquid medium; (b) dispensing and depositing the suspension onto a surface of a supporting substrate to form a wet layer of aromatic molecules, wherein the procedure includes subjecting the suspension to an orientation-inducing stress or strain; (c) partially or completely removing the liquid medium; and (d) heat treating the resulting dried layer at a first temperature selected from 25° C. to 3,200° C. so that the aromatic molecules are merged or fused into larger aromatic molecules to form the graphitic film having graphene domains or graphite crystals, wherein the larger aromatic molecules or graphene planes in the graphene domains or graphite crystals are substantially parallel to each other.

21 Claims, 5 Drawing Sheets

(56) References Cited

U.S. PATENT DOCUMENTS

| | | | |
|---|---|---|---|
| 2008/0014426 A1* | 1/2008 | Nishikawa | C04B 35/522 |
| | | | 428/220 |
| 2008/0248275 A1 | 10/2008 | Jang et al. | |
| 2009/0169467 A1* | 7/2009 | Zhamu | C01B 32/19 |
| | | | 423/448 |
| 2010/0085713 A1 | 4/2010 | Balandin et al. | |
| 2010/0140792 A1 | 6/2010 | Haddon et al. | |
| 2011/0108978 A1 | 5/2011 | Kim et al. | |
| 2012/0171574 A1* | 7/2012 | Zhamu | H01M 4/364 |
| | | | 429/300 |
| 2015/0235741 A1 | 8/2015 | Sumi et al. | |
| 2015/0266739 A1* | 9/2015 | Zhamu | C01B 32/182 |
| | | | 428/408 |
| 2017/0037257 A1 | 2/2017 | Yang et al. | |

OTHER PUBLICATIONS

Hummers et al., "Preparation of graphitic oxide" J. Am. Chem. Soc. (1958) vol. 80, p. 1339.

Jang et al., "Processing of Nano Graphene Platelets (NGPs) and NGP Nanocomposites: A Review" J. Materials Sci. (2008) vol. 43, pp. 5092-5101.

PCT/US18/49825 International Search Report and Written Opinion dated Nov. 5, 2018, 9 pages.

U.S. Appl. No. 15/700,756 Nonfinal Office Action dated Oct. 12, 2018, 7 pages.

Yang et al., "Two-dimensional Graphene Nano-ribbons" J. Am. Chem. Soc. (2008) vol. 130, pp. 4216-4217.

* cited by examiner

```
                    20
                     ↘

┌──────────────────────────────────────────────────────────────────────────┐
│ Providing a suspension of aromatic molecules dispersed or dissolved in a │
│ liquid medium, wherein said aromatic molecules are selected from petroleum│
│ heavy oil or pitch, coal tar pitch, a polynuclear hydrocarbon, a         │──22
│ halogenated variant thereof, or a combination thereof and wherein said   │
│ aromatic molecules, containing a plane of hexagonal carbon atoms or fused│
│ aromatic rings, have an initial length or width from 5 nm to 1 μm        │
└──────────────────────────────────────────────────────────────────────────┘
                                    ↓
┌──────────────────────────────────────────────────────────────────────────┐
│ Dispensing and depositing said suspension onto a surface of a supporting │
│ substrate to form a wet layer of aromatic molecules, wherein said        │──24
│ dispensing and depositing procedure includes subjecting said suspension  │
│ to an orientation-inducing stress or strain                              │
└──────────────────────────────────────────────────────────────────────────┘
                                    ↓
┌──────────────────────────────────────────────────────────────────────────┐
│ Partially or completely removing said liquid medium from the wet layer to│──26
│ form a dried layer of aromatic molecules                                 │
└──────────────────────────────────────────────────────────────────────────┘
                                    ↓
┌──────────────────────────────────────────────────────────────────────────┐
│ Heat treating said dried layer of aromatic molecules at a first          │
│ temperature selected from 25°C to 3,000°C so that said aromatic molecules│
│ are merged or fused into larger aromatic molecules, larger than said     │──28
│ initial length or width, to form said graphitic film having graphene     │
│ domains or graphite crystals, wherein said larger aromatic molecules or  │
│ graphene planes in said graphene domains or graphite crystals are        │
│ substantially parallel to each other                                     │
└──────────────────────────────────────────────────────────────────────────┘
```

FIG. 4

PRODUCTION OF GRAPHITIC FILMS DIRECTLY FROM HIGHLY AROMATIC MOLECULES

FIELD

The present disclosure relates to the art of graphitic materials and, in particular, to a method of rapidly producing a graphitic film in an environmentally benign manner from aromatic hydrocarbon molecules.

BACKGROUND

Advanced EMI shielding and thermal management materials are becoming more and more critical for today's microelectronic, photonic, and photovoltaic systems. These systems require shielding against EMI from external sources. These systems can be sources of electromagnetic interference to other sensitive electronic devices and, hence, must be shielded. Materials for EMI shielding applications must be electrically conducting.

Further, as new and more powerful chip designs and light-emitting diode (LED) systems are introduced, they consume more power and generate more heat. This has made thermal management a crucial issue in today's high performance systems. Systems ranging from active electronically scanned radar arrays, web servers, large battery packs for personal consumer electronics, wide-screen displays, and solid-state lighting devices all require high thermal conductivity materials that can dissipate heat more efficiently. Furthermore, many microelectronic devices (e.g. smart phones, flat-screen TVs, tablets, and laptop computers) are designed and fabricated to become increasingly smaller, thinner, lighter, and tighter. This further increases the difficulty of thermal dissipation. Actually, thermal management challenges are now widely recognized as the key barriers to industry's ability to provide continued improvements in device and system performance.

Heat sinks are components that facilitate heat dissipation from the surface of a heat source, such as a CPU or battery in a computing device, to a cooler environment, such as ambient air. Typically, heat transfer between a solid surface and the air is the least efficient within the system, and the solid-air interface thus represents the greatest barrier for heat dissipation. A heat sink is designed to enhance the heat transfer efficiency between a heat source and the air mainly through increased heat sink surface area that is in direct contact with the air. This design enables a faster heat dissipation rate and thus lowers the device operating temperature.

Materials for thermal management applications (e.g. as a heat sink or heat spreader) must be thermally conducting. Typically, heat sinks are made from a metal, especially copper or aluminum, due to the ability of metal to readily transfer heat across its entire structure. Cu and Al heat sinks are formed with fins or other structures to increase the surface area of the heat sink, often with air being forced across or through the fins to facilitate dissipation of heat to the air. However, there are several major drawbacks or limitations associated with the use of metallic heat sinks. One drawback relates to the relatively low thermal conductivity of a metal (<400 W/mK for Cu and 80-200 W/mK for Al alloy). In addition, the use of copper or aluminum heat sinks can present a problem because of the weight of the metal, particularly when the heating area is significantly smaller than that of the heat sink. For instance, pure copper weighs 8.96 grams per cubic centimeter (g/cm$^3$) and pure aluminum weighs 2.70 g/cm$^3$. In many applications, several heat sinks need to be arrayed on a circuit board to dissipate heat from a variety of components on the board. If metallic heat sinks are employed, the sheer weight of the metal on the board can increase the chances of the board cracking or of other undesirable effects, and increases the weight of the component itself. Many metals do not exhibit a high surface thermal emissivity and thus do not effectively dissipate heat through the radiation mechanism.

Thus, there is a strong need for a non-metallic heat sink system effective for dissipating heat produced by a heat source such as a CPU and battery in a device. The heat sink system should exhibit a higher thermal conductivity and/or a higher thermal conductivity-to-weight ratio as compared to metallic heat sinks. These heat sinks must also be mass-producible, preferably using a cost-effective process. This processing ease requirement is important since metallic heat sinks can be readily produced in large quantities using scalable techniques such as extrusion, stamping, and die casting.

One group of materials potentially suitable for both EMI shielding and heat dissipation applications is the graphitic carbon or graphite. Carbon is known to have five unique crystalline structures, including diamond, fullerene (0-D nanographitic material), carbon nanotube or carbon nanofiber (1-D nanographitic material), graphene (2-D nanographitic material), and graphite (3-D graphitic material). The carbon nanotube (CNT) refers to a tubular structure grown with a single wall or multi-wall. Carbon nanotubes (CNTs) and carbon nanofibers (CNFs) have a diameter on the order of a few nanometers to a few hundred nanometers. Their longitudinal, hollow structures impart unique mechanical, electrical and chemical properties to the material. The CNT or CNF is a one-dimensional nanocarbon or 1-D nanographite material.

Bulk natural graphite powder is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are different in orientation. In other words, the orientations of the various grains in a graphite particle typically differ from one grain to another. This presents a problem as explained below:

A graphite single crystal (crystallite) per se or a crystalline grain in a graphite particle is anisotropic with a property measured along a direction in the basal plane (crystallographic a- or b-axis direction) being dramatically different than if measured along the crystallographic c-axis direction (thickness direction). For instance, the thermal conductivity of a graphite single crystal can be up to approximately 1,920 W/mK (theoretical) or 1,800 W/mK (experimental) in the basal plane (crystallographic a- and b-axis directions), but that along the crystallographic c-axis direction is less than 10 W/mK (typically less than 5 W/mK). Furthermore, there are large amounts of highly deficient boundaries between grains that impede the movement of electrons and phonons (quantized lattice vibrations), the two heat conduction mechanisms according to quantum mechanics. Consequently, a natural graphite particle composed of multiple grains of different orientations with highly defected grain boundaries exhibits an average property between these two extremes. This average conductivity, typically less than 200 W/mK, is insufficient for microelectronic device heat dissipation applications.

One approach to overcoming this problem is to make use of flexible graphite foil. The flexible graphite foil is obtained by the following typical steps: (a) intercalating particles of natural graphite with an intercalant (e.g. mixture of sulfuric acid and nitric acid) to form a graphite intercalation compound (GIC); (b) exposing the GIC to a thermal shock treatment (typically 650° C.-1,100° C.) to produce exfoliated graphite (also referred to as graphite worms); and then (c) compressing or roll-pressing exfoliated graphite worms into paper-like sheets or foil. Details are given in a later section. For electronic device thermal management applications (e.g. as a heat sink material in a smart phone), flexible graphite (FG) foils have the following major deficiencies:

(1) As indicated earlier, FG foils exhibit a relatively low thermal conductivity, typically <500 W/mK and more typically <300 W/mK. By impregnating the exfoliated graphite with a resin, the resulting composite exhibits an even lower thermal conductivity (typically <<200 W/mK, more typically <100 W/mK).

(2) Flexible graphite foils, without a resin impregnated therein or coated thereon, are of low strength, low rigidity, and poor structural integrity. The high tendency for flexible graphite foils to get torn apart makes them difficult to handle in the process of making a heat sink. As a matter of fact, the flexible graphite sheets (typically 50-200 m thick) are so "flexible" that they are not sufficiently rigid to make a fin component material for a finned heat sink.

(3) Another very subtle, largely ignored or overlooked, but critically important feature of FG foils is their high tendency to get flaky with graphite flakes easily coming off from FG sheet surfaces and emitting out to other parts of a microelectronic device. These highly electrically conducting flakes (typically 1-200 μm in lateral dimensions and >100 nm in thickness) can cause internal shorting and failure of electronic devices.

A new class of nanocarbon material is graphene, a 2-D material having a hexagonal arrangement of carbon atoms. These honeycomb-like carbon atoms can form a free standing sheet that is one-atom thick, which is now commonly referred to as a single-layer graphene sheet. Several layers of graphene planes can be bonded together to form a multi-layer graphene sheet or platelets, which contain less than 300 graphene planes or layers (or thinner than 100 nm), preferably less than 20 layers, and further preferably less than 10 layers (few-layer graphene). In both single-layer graphene and multi-layer graphene sheets, the graphene planes or edges can contain some non-carbon elements, such as hydrogen, oxygen, nitrogen, and fluorine, to name just a few. All these single-layer or multi-layer graphene sheets (0.24 nm to 100 nm thick) are herein collectively referred to as nanographene platelets (NGPs). This is further discussed in a later section.

Multiple sheets of a graphene material (e.g. discrete nanosheets/platelets of pristine graphene, graphene oxide, reduced graphene oxide, graphene fluoride, nitrogenated graphene, hydrogenated graphene, boron-doped graphene, etc.) can be packed into a film, membrane, or paper sheet. These aggregates typically do not exhibit a high thermal conductivity unless these sheets/platelets are closely packed and the film/membrane/paper is ultra-thin (e.g. <1 μm, which is mechanically weak). This is reported in our earlier U.S. patent application Ser. No. 11/784,606 (Apr. 9, 2007) (U.S. Pat. Pub. No. 2008/0248275). In general, a paper-like structure or mat made from platelets of graphene, graphene oxide (GO), or reduced graphene oxide (RGO) (e.g. those paper sheets prepared by vacuum-assisted filtration process) exhibit many defects, wrinkled or folded graphene sheets, interruptions or gaps between platelets, and non-parallel platelets, leading to relatively poor thermal conductivity, low electric conductivity, and low structural strength. These papers or aggregates of discrete graphene, GO or RGO platelets alone (without a resin binder) also have a tendency to get flaky, emitting conductive particles into air.

Our earlier application (U.S. application Ser. No. 11/784, 606) also disclosed a mat, film, or paper of NGPs infiltrated with a metal, glass, ceramic, resin, and CVD carbon matrix material (graphene sheets/platelets being the filler or reinforcement phase, not the matrix phase in this earlier application). Haddon, et al. (U.S. Pub. No. 2010/0140792, Jun. 10, 2010) also reported NGP thin film and NGP-reinforced polymer matrix composites for thermal management applications. The NGP-reinforced polymer matrix composites, as an intended thermal interface material, have very low thermal conductivity, typically <<2 W/mK. The NGP films of Haddon, et al are essentially non-woven aggregates of discrete graphene platelets, identical to those of our earlier invention (U.S. application Ser. No. 11/784,606). Again, these aggregates have a great tendency to have graphite particles flaking and separated from the film surface, creating internal shorting problem for the electronic device containing these aggregates. They also exhibit low thermal conductivity unless made into thin films (10 nm-300 nm, as reported by Haddon, et al) which are very difficult to handle in a real device manufacturing environment. Balandin, et al (U.S. Pub. No. 2010/0085713, Apr. 8, 2010) disclosed a graphene layer produced by CVD deposition or diamond conversion for heat spreader application. More recently, Kim, et al (N. P. Kim and J. P. Huang, "Graphene Nanoplatelet Metal Matrix," U.S. Pub. No. 2011/0108978, May 10, 2011) reported metal matrix infiltrated NGPs. However, the metal matrix is too heavy and the resulting metal matrix composite does not exhibit a high thermal conductivity.

Another prior art material for thermal management or EMI shielding application is the pyrolitic graphite film produced from a thermally stable polymer, such as polyimide (PI). The process begins with carbonizing a polymer film at a carbonization temperature of typically 400° C.-1,500° C. under a typical pressure of 10-15 $Kg/cm^2$ for 6-36 hours to obtain a carbonized film, which is followed by a graphitization treatment at 2,500° C.-3,200° C. under an ultrahigh pressure of 100-300 $Kg/cm^2$ for 5-36 hours, depending upon the graphitization temperature used to form a graphitic film. There are several major drawbacks associated with this process for producing graphitic films:

(1) Synthesis of thermally stable polymers has been a challenging process that typically begins with synthesis of monomers, which are themselves expensive. This is a difficult, slow, tedious, energy-intensive, and very expensive process.

(2) Technically, it is utmost challenging to maintain such an ultrahigh pressure (>100 $Kg/cm^2$) at such an ultrahigh temperature (>2,500° C.) during the carbonization and graphitization procedures. The combined high temperature and high pressure conditions, even if achievable, are not cost-effective.

(3) This polymer carbonization and graphitization process typically is not conducive to the production of either thick graphitic films (>50 m) or very thin films (<10 m).

(4) In general, high-quality graphitic films could not be produced with a final graphitization temperature lower than 2,700° C., unless when a highly oriented polymer is used as a starting material, which is carbonized for an extended period of time prior to graphitization (e.g. please see Y. Nishikawa, et al. "Filmy graphite and process for producing the same," U.S. Pat. No. 7,758, 842 (Jul. 20, 2010)) or a catalytic metal is brought in contact with a highly oriented polymer during carbonization and graphitization (Y. Nishikawa, et al. "Process for producing graphite film," U.S. Pat. No. 8,105, 565 (Jan. 31, 2012)). This high degree of molecular orientation, as expressed in terms of optical birefringence, is not always possible to achieve with polymers. Further, the use of a catalytic metal tends to contaminate the resulting graphite films with metallic elements. Furthermore, the total heat treatment times (carbonization and graphitization combined) are too long and the amount of energy consumed is too high.

(5) The resulting graphitic films tend to be brittle and of low mechanical strength.

Thus, it is an object of the present disclosure to provide a process for producing graphitic films that exhibit a combination of exceptional thermal conductivity, electrical conductivity, and mechanical strength unmatched by any material of comparable thickness range.

Another object of the present disclosure is to provide a cost-effective process for producing a thermally conductive graphitic film directly from low molecular weight species without going through a conventional polymerization procedure and without a graphene production procedure.

As compared to conventional processes, this inventive process involves significantly shorter heat treatment times and lower amounts of energy consumed, yet resulting in graphitic films that are of comparable or even higher thermal conductivity, higher electrical conductivity, and/or higher strength.

SUMMARY

The present disclosure provides a strikingly simple, fast, scalable, environmentally benign, and cost-effective process or method that meets the afore-mentioned needs. This method is capable of producing a graphitic film directly from a precursor to carbon or graphite (referred to as a carbon/graphite precursor), including highly aromatic molecules or polycyclic aromatic hydrocarbons (PAH).

In certain embodiments, the disclosure provides a method of producing a graphitic film having a thickness from 2 nm to 1,000 m (preferably from 10 nm to 500 m and further preferably from 100 nm to 200 µm), the method comprising:

a) providing a suspension of aromatic molecules dispersed or dissolved in a liquid medium, wherein the aromatic molecules are selected from petroleum heavy oil or pitch, coal tar pitch, a polynuclear hydrocarbon, a halogenated variant thereof, or a combination thereof and wherein said aromatic molecules, containing a plane of hexagonal carbon atoms or fused aromatic rings, have an initial length or width from 5 nm to 1 µm;

b) dispensing and depositing the suspension onto a surface of a supporting substrate to form a wet layer of aromatic molecules, wherein the dispensing and depositing procedure includes subjecting the suspension to an orientation-inducing stress or strain;

c) partially or completely removing the liquid medium from the wet layer to form a dried layer of aromatic molecules; and d) heat treating the dried layer of aromatic molecules at a first temperature selected from 25° C. to 3,000° C. so that the aromatic molecules are merged or fused (e.g. edge-to-edge) into larger aromatic molecules, larger than the initial length or width, to form the graphitic film having graphene domains or graphite crystals, wherein the larger aromatic molecules or graphene planes in the graphene domains or graphite crystals are substantially parallel to each other.

It may be noted that, preferably and typically, the suspension provided in Step (a) does not include the formation of a mesophase sphere or the mesocarbon microbeads (MCMB). The preparation of such a suspension may include operating mechanical or chemical means to disrupt or interrupt the incipient formation of MCMBs. This MCMB production process is illustrated in FIG. 2. The presence of these mesophase spheres or mesocarbon beads are not conducive to aligning the aromatic molecules to form a preferred orientation of the wet film, dried film, and final graphitic film.

In the method, the liquid medium may comprise a disordered matrix of carbon or hydrocarbon molecules. In some embodiments, the graphene domains or graphite crystals have a length or width from 10 nm to 10 m or an inter-graphene spacing from 0.34 nm to 2.2 nm.

The polynuclear hydrocarbon is preferably selected from naphthalene, anthracene, phenanthrene, tetracene, chrysene, triphenylene, pyrene, pentacene, benzo-pyrene, corannulene, benzo-perylene, coronene, ovalene, benzo-fluorene, a halogenated version thereof, a derivative thereof having a substituent on a ring structure thereof, a chemical derivative thereof, or a combination thereof.

In some embodiments, heat treating is conducted after the film of aromatic molecules is produced; such a film contains the highly aligned (oriented) aromatic molecules that are close to one another and are substantially parallel to one another. Such a preferred molecular orientation or alignment enables the aromatic molecules, when being heat-treated at a first temperature selected from 25° C. to 3,000° C., to be chemically merged or fused into larger (i.e. longer and wider) aromatic molecules or graphene planes. As the heat treatment proceeds or is conducted at a higher temperature, these larger aromatic molecules or graphene planes not only grow in size (becoming longer and wider) but also can form graphene domains (also aligned to be parallel to each other) dispersed in a disordered matrix of carbon or hydrocarbon molecules. The graphene domains are each composed of from 1 to 100 planes (more typically <30 planes) of hexagonal carbon atoms or fused aromatic rings having a length or width from 4 nm to 100 m (more typically from 5 nm to 35 m and further more typically from 10 nm to 10 m) and, in the situations wherein there are 2 or more planes in a graphene domain, an inter-graphene space between two planes of hexagonal carbon atoms or fused aromatic rings can be reduced to less than 0.4 nm.

Aromatic graphene molecules may contain halogen selected from F, Cl, Br, I, or a combination thereof. The halogen atoms in the halogenated aromatic molecules are preferably attached to a carbon atom at the edge of a fused benzene ring-type structure. The halogen atoms are preferably not part of the fused benzene ring structure.

Preferably, the polynuclear hydrocarbon may contain halogenated polynuclear hydrocarbon selected from halogenated versions of naphthalene, anthracene, phenanthrene, tetracene, chrysene, triphenylene, pyrene, pentacene, benzo-pyrene, corannulene, benzo-perylene, coronene, ovalene, benzo-fluorene, a derivative thereof having a substituent on a ring structure thereof, a chemical derivative thereof, or a combination thereof.

The halogenation of aromatic molecules is well known in the art. For instance, halogenation of anthracene may be accomplished by following the approaches proposed by Duan, et a. [Duan, Turk, Speigle, Corbin, Masnovi and Baker, Halogenations of Anthracenes and Dibenz[a,c]anthracene with N-Bromosuccinimide and N-Chlorosuccinimide, The Journal of Organic Chemistry, 2000 65 (10), pp 3005-3009]. For instance,

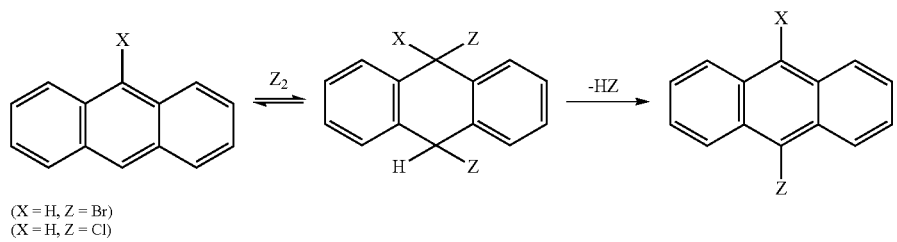

(X = H, Z = Br)
(X = H, Z = Cl)

The aromatic molecules, prior to step (a) or (b), may be preferably attached with some desired functional groups that facilitate or promote edge-to-edge chemical merging or linking between molecules during step (c) of heat-treating. In some embodiments, aromatic molecules recited in step (a) are chemically functionalized with a functional group selected from —OH, —COOH, —NH$_2$, —C=O, or a combination thereof.

In some embodiments, the functional group attached to the aromatic molecules prior to step (a) or (b) may be selected from alkyl or aryl silane, alkyl or aralkyl group, hydroxyl group, carboxyl group, amine group, sulfonate group (—SO$_3$H), aldehydic group, quinoidal, fluorocarbon, or a combination thereof.

In certain embodiments, the functional group attached to the aromatic molecules prior to step (a) or (b) may contain an azide compound selected from the group consisting of 2-Azidoethanol, 3-Azidopropan-1-amine, 4-(2-Azidoethoxy)-4-oxobutanoic acid, 2-Azidoethyl-2-bromo-2-methyl-propanoate, chlorocarbonate, azidocarbonate, dichlorocarbene, carbene, aryne, nitrene, (R-)-oxycarbonyl nitrenes, where R=any one of the following groups,

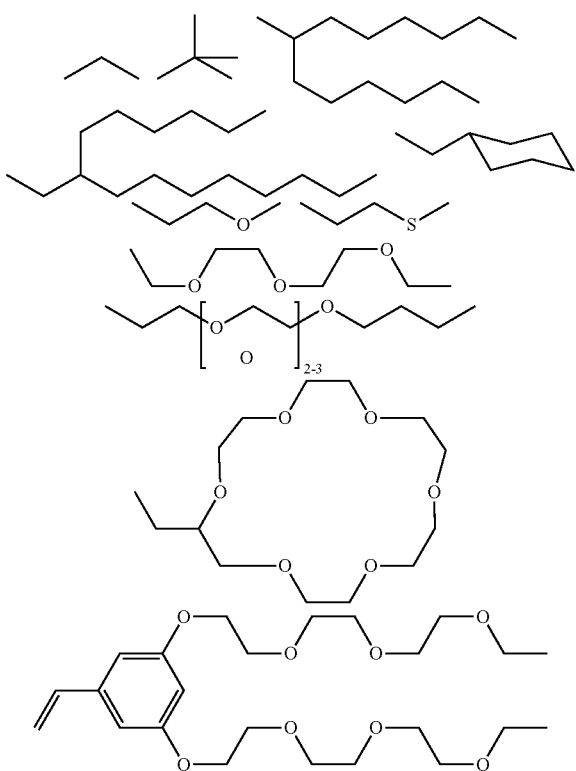

and combinations thereof.

In certain embodiments, the functional group attached to the aromatic molecules prior to step (a) or (b) may contain an oxygenated group selected from the group consisting of hydroxyl, peroxide, ether, keto, and aldehyde. In certain embodiments, the functionalizing agent contains a functional group selected from the group consisting of SO$_3$H, COOH, NH$_2$, OH, R'CHOH, CHO, CN, COCl, halide, COSH, SH, COOR', SR', SiR'$_3$, Si(—OR'—)$_y$R'$_{3-y}$, Si(—O—SiR'$_2$—)OR', R'', Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide, and Z is carboxylate or trifluoroacetate, and combinations thereof.

In some embodiments, the functional group attached to the aromatic molecules prior to step (a) or (b) may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof. The functionalizing agent may contain an acrylonitrile chain, polyfurfuryl alcohol, phenolic resin, or a combination thereof.

In some embodiments, the functional group is selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R'', R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

In certain embodiments, the suspension in step (a) may contain a catalyst that promotes the chemical linking between aromatic molecules and facilitates the formation of graphene domains or graphite single crystals during the heat treatment step. Preferably, the catalyst contains a transition metal selected from Ti, V, Cr, Mn, Fe, Co, Ni, Cu, Zn, Zr, Nb, Mo, Ru, Pd, Ag, Cd, Pt, Au, or a combination thereof. In some embodiments, the catalyst contains a chemical species selected from PdCl$_2$, FeCl$_3$, FeBr$_3$, FeF$_3$, NiBr$_2$, NiI$_2$, Cs$_2$CO$_3$, CsF, CsCl, CsBr, CH$_2$CL$_2$, or a combination thereof.

In certain embodiments, the method further comprise a step of compressing the graphitic film (during step (c), step (d) and/or after step (d)) to produce a highly conducting graphitic film having a physical density no less than 1.6 g/cm$^3$. Preferably, step (d) of heat treating the dried layer of aromatic molecules is conducted while a compressive stress is imposed on the dried layer.

In some embodiments, the suspension contains the aromatic molecules in an amount sufficient to form a liquid crystal phase in the liquid medium.

In some embodiments, the liquid medium contains a non-aqueous solvent selected from polyethylene glycol, ethylene glycol, propylene glycol, an alcohol, a sugar alcohol, a polyglycerol, a glycol ether, an amine based solvent, an amide based solvent, an alkylene carbonate, an organic acid, or an inorganic acid.

Preferably, steps (b), (c) and (d) are conducted in a roll-to-roll manner and the process is a continuous, reel-to-reel process.

In some embodiments, the first heat treatment temperature contains a temperature in the range from 100° C.-1,500° C. and the graphitic film has an oxygen content less than 2.0%, an inter-planar spacing less than 0.35 nm, a physical density no less than 1.6 g/cm$^3$, a thermal conductivity of at least 800 W/mK, and/or an electrical conductivity no less than 2,500 S/cm.

In some embodiments, the first heat treatment temperature contains a temperature in the range from 1,500° C.-2,100° C. and the graphitic film has an oxygen content less than 1.0%, an inter-planar spacing less than 0.345 nm, a thermal conductivity of at least 1,000 W/mK, and/or an electrical conductivity no less than 5,000 S/cm.

In some embodiments, the first heat treatment temperature contains a temperature greater than 2,100° C. and the graphitic film has an oxygen content no greater than 0.1%, an inter-graphene spacing less than 0.340 nm, a mosaic spread value no greater than 0.7, a thermal conductivity of at least 1,300 W/mK, and/or an electrical conductivity no less than 8,000 S/cm.

In some embodiments, the first heat treatment temperature contains a temperature no less than 2,500° C. and the highly graphitic film has an inter-graphene spacing less than 0.336 nm, a mosaic spread value no greater than 0.4, a thermal conductivity greater than 1,600 W/mK, and/or an electrical conductivity greater than 10,000 S/cm.

In some embodiments, the graphitic film exhibits a degree of graphitization no less than 80% and/or a mosaic spread value less than 0.4.

In certain embodiments, step (b) further includes heat-treating the graphene domains at a second temperature selected from 300° C. to 3,200° C. for at least 0.5 hours prior to step (c). This is more typically from 1 to 96 hours, but still more typically from 2 to 48 hours.

BRIEF DESCRIPTION OF THE DRAWINGS

FIG. 4 Flowchart showing the presently disclosed method of producing a graphitic film

DETAILED DESCRIPTION OF PREFERRED EMBODIMENTS

Figure 1:
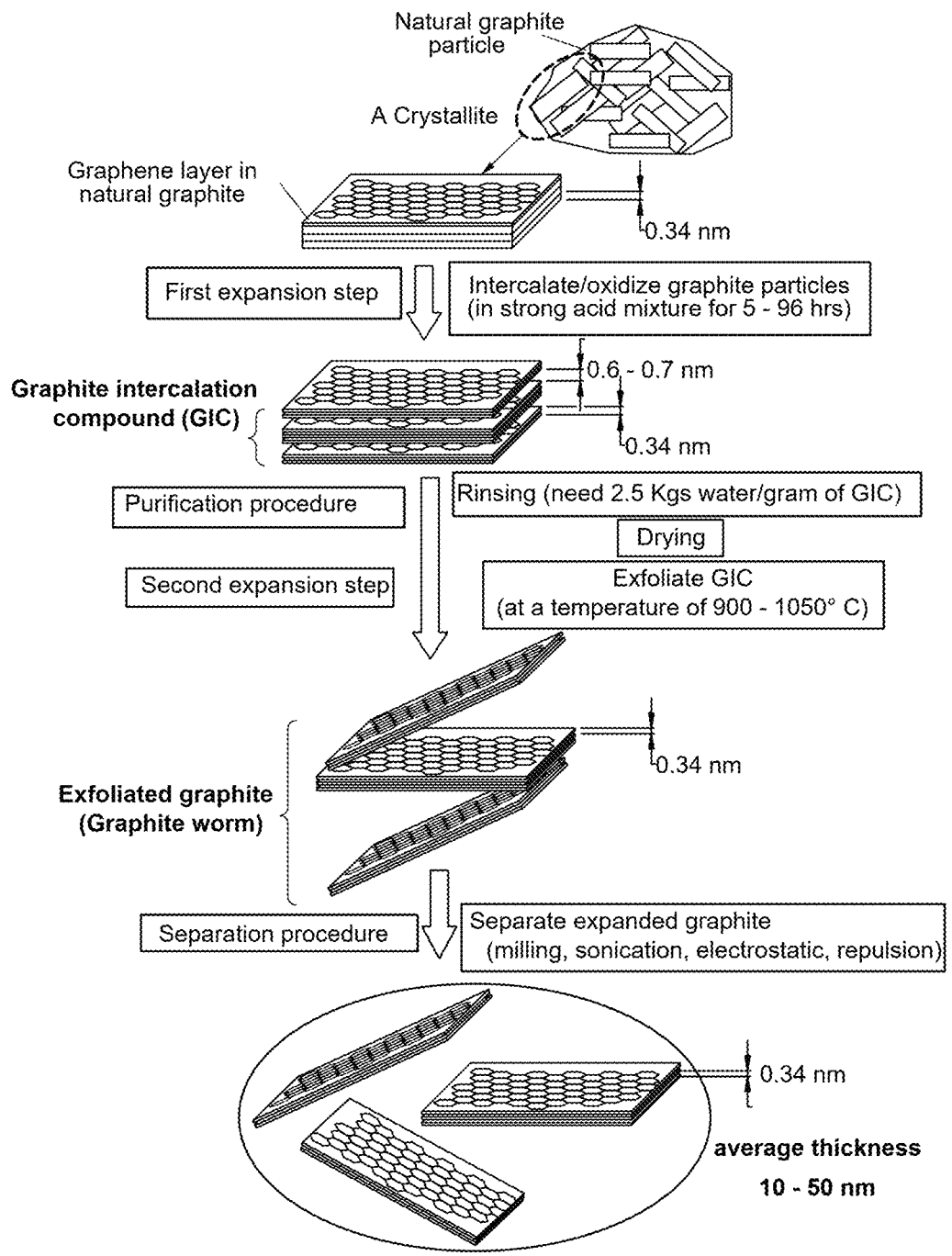
FIG. 1 A flow chart showing the most commonly used prior art process of producing highly oxidized NGPs that entails tedious chemical oxidation/intercalation, rinsing, and high-temperature exfoliation procedures. These graphene oxide sheets are then aggregated, compressed and heat-treated to produce graphene-based graphitic films. The present method obviates the need for a step of producing the intermediate graphene or graphene oxide sheets.
Figure 2:
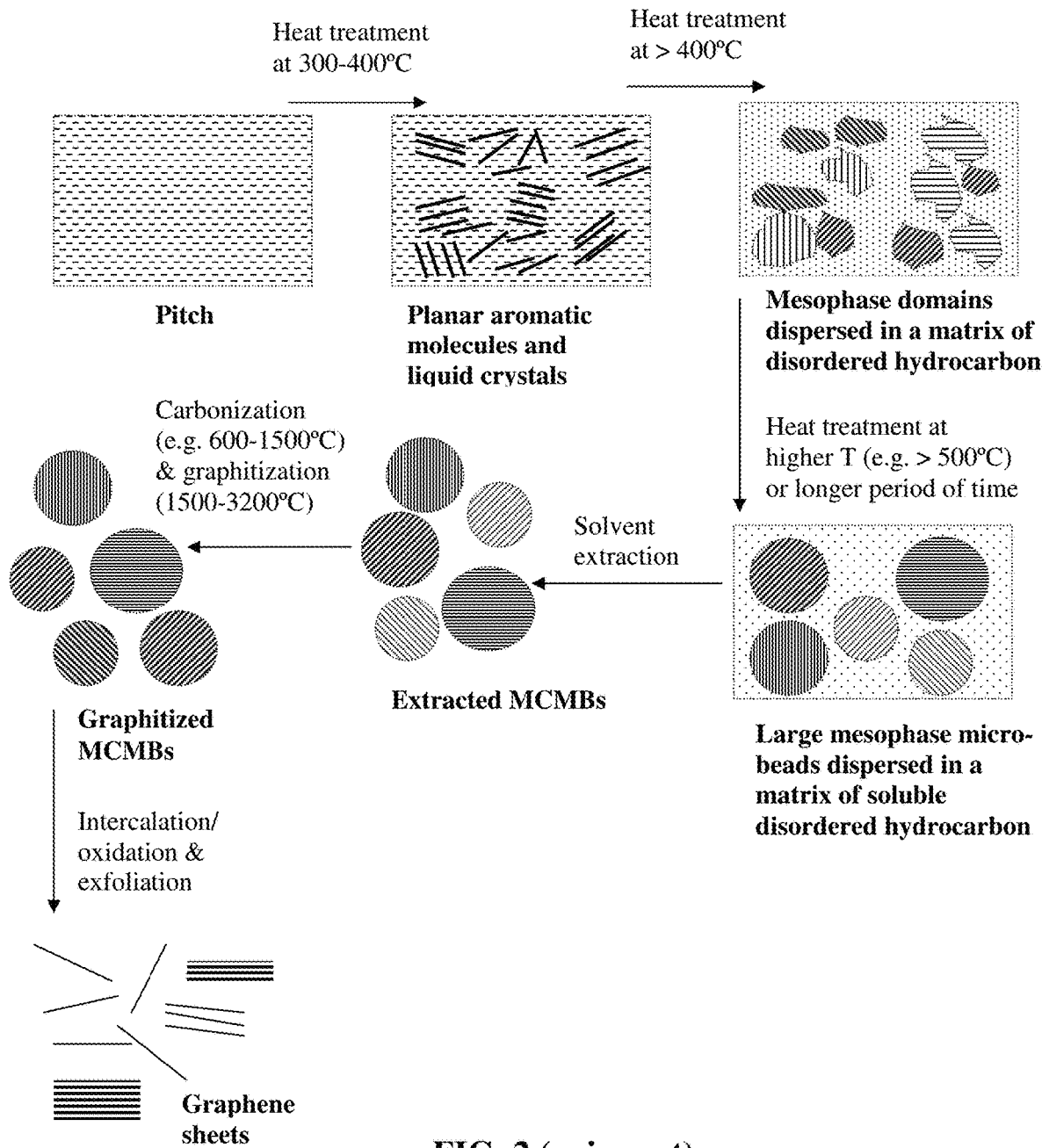
FIG. 2 A flow chart showing a prior art process that entails heat-treating petroleum or coal tar pitch at 300° C.-400° C. to produce planar aromatic molecules, heating the planar aromatic molecules at >400° C. to produce mesophase domains, further heating to produce mesophase spheres dispersed in a disordered hydrocarbon matrix, extracting the mesophase spheres to produce extracted mesocarbon microbeads (extracted MCMBs or "green" MCMBs), carbonizing and graphitizing extracted MCMBs to produce (graphitized) MCMBs, chemically intercalating or oxidizing MCMBs to produce GIC or GO, thermally or mechanically exfoliate GIC or GO to produce graphite worms, and mechanically shearing the graphite worms to produce isolated graphene sheets. These graphene sheets are then combined and compressed into graphene films.

As discussed in the Background section, a pyrolitic graphite film may be produced from a thermally stable polymer, such as polyimide (PI). An alternative method is to produce isolated/separated graphene sheets or nanographene platelets (NGP) which are then stacked or packed to form a film. An NGP is essentially composed of a graphene plane (hexagonal lattice of carbon atoms) or multiple graphene planes stacked and bonded together (typically up to 10 graphene planes per multi-layer platelet). Each graphene plane, also referred to as a graphene sheet, comprises a two-dimensional hexagonal structure of carbon atoms. Each platelet has a length and a width parallel to the graphene plane and a thickness orthogonal to the graphene plane. By definition, the thickness of an NGP can be 100 nanometers (nm) or smaller (preferably containing no greater than 10 hexagonal planes), with a single-sheet NGP, also referred to as single-layer graphene, being as thin as 0.34 nm.

As further discussed below, the prior art processes for forming isolated graphene sheets typically have several major drawbacks. It would be problematic to produce these isolated graphene sheets first, followed by packing these graphene sheets into a film structure.

Currently, the most commonly used method of graphene production is the so-called chemical method. This method entails chemical intercalation or oxidation of natural graphite or synthetic graphite particles. These particles are essentially already in the fully graphitized state. Prior to intercalation or oxidation, the graphite particle has an inter-graphene plane spacing as small as approximately 0.335 nm ($L_d$=$d_{002}$=0.335 nm). Due to the short-range force nature of van der Waals forces, the bonding between graphene planes is very strong, making it difficult for any chemical species to intercalate into the inter-graphene spaces. Hence, it normally takes a combination of a strong acid (e.g. sulfuric acid) and a strong oxidant (e.g. potassium permanganate or nitic acid) and a long reaction time to achieve full chemical intercalation or oxidation of graphite to produce the graphite intercalation compound (GIC) or graphite oxide (GO). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water to produce graphene sheets.

As such, this approach basically entails three distinct procedures: first expansion (oxidation or intercalation), further expansion (or "exfoliation"), and separation. This approach has 7 major deficiencies: (a) The process requires the use of large quantities of several undesirable chemicals; (b) The chemical treatment process requires a long intercalation and oxidation time; (c) Strong acids consume a significant amount of starting graphite material; (d) The process is a highly energy-intensive process; (e) The approach requires a very tedious washing and purification step; (f) The resulting products are GO platelets that must undergo a further chemical or thermal reduction treatment to reduce the oxygen content; and (g) The process can induce negative environmental impact. The resulting GO or RGO sheets are then coated, heat-treated, and compacted into a thin film.

The present disclosure provides a brand-new method of producing graphitic films directly from a carbon/graphite precursor without going through the intermediate step of forming isolated graphene sheets. The carbon/graphite precursor includes highly aromatic molecules or polycyclic aromatic hydrocarbons (PAH).

This strikingly simple and elegant process avoids all the afore-mentioned 7 problems associated with the chemical method of graphene production, followed by re-merging and packing of these GO/RGO sheets into a film.

In certain embodiments, the disclosure provides as schematically illustrated in FIG. 4 a method 20 of producing a graphitic film having a thickness from 2 nm to 1,000 μm (preferably from 10 nm to 500 μm and further preferably from 100 nm to 200 μm), the method comprising: (a) providing (22) a suspension of aromatic molecules dispersed or dissolved in a liquid medium, wherein the aromatic molecules are selected from petroleum heavy oil or pitch, coal tar pitch, a polynuclear hydrocarbon, a halogenated variant thereof, or a combination thereof and wherein the aromatic molecules, containing a plane of hexagonal carbon atoms or fused aromatic rings, have an initial length or width from 5 nm to 1 μm; (b) dispensing and depositing (24) the suspension onto a surface of a supporting substrate to form a wet layer of aromatic molecules, wherein the dispensing and depositing procedure includes subjecting the suspension to an orientation-inducing stress or strain; (c) partially or completely removing (26) the liquid medium from the wet layer to form a dried layer of aromatic molecules; and (d) heat treating (28) the dried layer of aromatic molecules at a first temperature selected from 25° C. to 3,000° C. so that the aromatic molecules are merged or fused (e.g. edge-to-edge) into larger aromatic molecules, larger than the initial length or width, to form the graphitic film having graphene domains or graphite crystals, wherein the larger aromatic molecules or graphene planes in the graphene domains or graphite crystals are substantially parallel to each other.

Polynuclear hydrocarbons (also referred to as polycyclic aromatic hydrocarbons, PAHs, polyaromatic hydrocarbons, or polynuclear aromatic hydrocarbons) are hydrocarbons (organic compounds containing mostly carbon and hydrogen) that are essentially composed of multiple aromatic rings fused together (fused organic rings in which the electrons are delocalized). Prior to the first heat treatment, the starting PAHs contain mostly or substantially all fused rings (e.g. chlorinated anthracene). Although not preferred, the starting aromatic materials in the instant process may be selected from those containing isolated benzene rings that are connected by a linear chain or bond (e.g. 2'-chloro-1,1': 4',1"-telphenyl). Herein, PAHs include those having further branching substituents on these ring structures. The simplest of such chemicals are naphthalene, having two aromatic rings, and the three-ring compounds anthracene and phenanthrene. Briefly, examples of PAHs are halogenated and non-halogenated versions of naphthalene, anthracene, phenanthrene, tetracene, chrysene, triphenylene, pyrene, pentacene, benzo-pyrene, corannulene, benzo-perylene, coronene, ovalene, and benzo-fluorene. PAHs of interest here typically have from 2 to 20 aromatic rings (approximately 10 to 60 carbon atoms) fused together, more typically from 2 to 10 rings (approximately 10 to 32 carbon atoms). However, they can have a larger number of fused rings or fused polycyclic aromatics.

Petroleum- or coal-derived pitch is a mixture of larger polynuclear hydrocarbons with an average molecular weight of approximately 200 amu (approximately 180-200 carbon atoms or 60-66 rings). Each pitch product is a mixture of many different types and sizes of polynuclear hydrocarbons. There are also a variety of impurities (1-10% by weight) in such pitch materials. In contrast, those PAHs mentioned above are substantially impurity-free.

In some embodiments, the disclosed method begins with providing a suspension of aromatic molecules dispersed or dissolved in a liquid medium, wherein the aromatic molecules are selected from petroleum heavy oil or pitch, coal tar pitch, a polynuclear hydrocarbon, a halogenated variant thereof, or a combination thereof. Then, the suspension is dispensed and deposited onto a surface of a supporting substrate (e.g. a plastic film/sheet, glass plate, stainless steel sheet, etc.) to form a wet layer of aromatic molecules, wherein the dispensing and depositing procedure includes subjecting the suspension to an orientation-inducing stress or strain to align the aromatic molecules substantially parallel to each other along a desired direction. This is followed by partially or completely removing the liquid medium from the wet layer to form a dried layer of aromatic molecules.

The method then includes a procedure of heat-treating the highly oriented (aligned) polycyclic aromatic hydrocarbon (PAH) molecules or a mixture of several pure PAHs at a first temperature selected from 25° C. to 3,000° C. (most preferably from 30° C. to 300° C.) to facilitate fusion or chemical merging of polycyclic aromatics to form larger (longer and/or wider PAH). In certain embodiments, the larger PAHs were subjected to a second heat treatment at a second heat treatment temperature (higher than the first temperature) selected from 300° C. to 3,200° C. (preferably from 300° C. to 1,500° C.). In some preferred embodiments, the heat treatments include a first heat treatment temperature preferably in the range from 30° C. to 300° C. for a heat treatment time of preferably 0.2 to 24 hours. This is followed by a second heat treatment at a second temperature from 300° C. to 1,500° C. for preferably 0.2 to 24 hours.

At the first heat treatment temperature of 150° C. to 300° C., the PAHs can undergo dehydrogenation polymerization that entails removal of non-carbon atoms, such as Cl, Br, H and N, and lateral merging of fused aromatic rings to form longer and wider aromatic molecules (polyaromatic molecules) or more aromatic rings fused together in the length and width directions, much like growing polymer chains. Such a structure of fused aromatic rings can grow to contain up to 300 carbon atoms or approximately 100 rings fused together. Such a structure is an incipient graphene sheet.

At a second heat treatment temperature selected from 300° C. to 1,500° C., these incipient graphene sheets continue to grow in lateral dimensions (length and width) which can reach several micrometers (0.5-100 μm and more typically 1-10 μm) and the resulting graphene sheets can each contain many thousands of fused rings. These dimensions and number of fused rings can be determined by using transmission electron microscopy (TEM) and atomic force microscopy (AFM).

As the polyaromatic molecules grow at a heat treatment temperature, the cohesive energy between polyaromatic molecules can eventually exceed the translational energy of individual polyaromatic molecules, resulting in the homogeneous nucleation of a new phase, called the mesophase. The polyaromatic molecules that constitute the mesophase are discotic, with one axis much smaller than the other two axes. These planar molecules can arrange themselves with the planes parallel to each other, forming nematic liquid crystals. Since these liquid crystals are substantially in a dried solid state and are highly aligned, continued heat treatments enable these liquid crystals to grow in dimensions to eventually become graphene domains or graphite single crystals in a film or sheet form, avoiding the formation of mesophase microbeads.

The aromatic molecules, prior to step (a) or (b), may be preferably attached with some desired functional groups that facilitate or promote edge-to-edge chemical merging or linking between neighboring aromatic molecules during step (c) of heat-treating. For instance, functional group such as —OH, —COOH, —NH$_2$, and —C=O attached at the edges of aromatic molecules can promote merging between molecules.

In certain embodiments, the functional group may be selected from SO$_3$H, COOH, NH$_2$, OH, R'CHOH, CHO, CN, COCl, halide, COSH, SH, COOR', SR', SiR'$_3$, Si(—OR'—)$_y$R'$_{3-y}$, Si(—O—SiR'$_2$—)OR', R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), hexamethylenetetramine, polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of aromatic molecules using one of their ends and, during subsequent heat treatments, are able to react with proper functional groups from adjacent aromatic molecules.

The functional group may be selected from OY, NHY, O=C—OY, P=C—NR'Y, O=C—SY, O=C—Y, —CR'1-OY, N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R", R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

A properly programmed heat treatment procedure for heat treating the dried layer of highly oriented (aligned) aromatic molecules can involve at least two heat treatment temperatures (first temperature for a period of time and then raised to a second temperature and maintained at this second temperature for another period of time), or any other combination of at least two heat treatment temperatures (HTT) that involve an initial treatment temperature (first temperature) and a final HTT, higher than the first.

The first heat treatment temperature is for chemical linking and thermal reduction of aligned polycyclic aromatic hydrocarbon (PAH) molecules and is conducted at the first temperature of >25° C. (can be up to 1,000° C., but preferably up to 700° C., and most preferably up to 300° C.). This is herein referred to as Regime 1:

Regime 1 (up to 300° C.): In this temperature range (the initial chemical linking and thermal reduction regime), chemical combination, polymerization (edge-to-edge merging), and cross-linking between adjacent PAH molecules begin to occur. Multiple PAH molecules are packed and chemically bonded together side by side and edge to edge to form an integrated layer of graphene oxide-like entity. In addition, the layer of PAH molecules primarily undergoes thermally-induced reduction reactions, leading to a reduction of oxygen content to approximately 5% or lower. This treatment results in a reduction of intergraphene spacing from approximately 0.8-1.2 nm (as dried) down to approximately 0.4 nm, and an increase in in-plane thermal conductivity from approximately 100 W/mK to 500 W/mK. Even with such a low temperature range, some chemical linking between PAH molecules occurs. The PAH molecules remain well-aligned, but the inter-graphene plane spacing remains relatively large (0.4 nm or larger). Many O-containing functional groups survive.

The highest or final HTT that the GO mass experiences may be divided into three distinct HTT regimes:

Regime 2 (300° C.-1,500° C.): In this mainly chemical linking regime, additional thermal reduction and extensive chemical combination, polymerization, and cross-linking between adjacent PAH molecules occur. The chemical linking between PAH molecules occurs. The oxygen and other non-carbon content is reduced to typically below 1% after chemical linking, resulting in a reduction of inter-graphene spacing to approximately 0.35 nm. This implies that some initial graphitization has already begun at such a low temperature, in stark contrast to conventional graphitizable materials (such as carbonized polyimide film) that typically require a temperature as high as 2,500° C. to initiate graphitization. This is another distinct feature of the presently invented graphitic film and its production processes. These chemical linking reactions result in an increase in in-plane thermal conductivity to 850-1,250 W/mK, and/or in-plane electrical conductivity to 3,500-4,500 S/cm.

Regime 3 (1,500-2,500° C.): In this ordering and re-graphitization regime, extensive graphitization or graphene plane merging occurs, leading to significantly improved degree of structural ordering. As a result, the oxygen content is reduced to typically 0.01% and the inter-graphene spacing to approximately 0.337 nm (achieving degree of graphitization from 1% to approximately 80%, depending upon the actual HTT and length of time). The improved degree of ordering is also reflected by an increase in in-plane thermal conductivity to >1,300-1,500 W/mK, and/or in-plane electrical conductivity to 5,000-7,000 S/cm.

Regime 4 (higher than 2,500° C.): In this re-crystallization and perfection regime, extensive movement and elimination of grain boundaries and other defects occur, resulting in the formation of nearly perfect single crystals or poly-crystalline graphene crystals with huge grains, which can be orders of magnitude larger than the original grain sizes of the starting PAH molecules. The oxygen content is essentially eliminated, typically 0.01%-0.1%. The inter-graphene spacing is reduced to down to approximately 0.3354 nm (degree of graphitization from 80% to nearly 100%), corresponding to that of a perfect graphite single crystal. Quite interestingly, the graphene domain has all the graphene planes being closely packed and bonded, and all the planes are aligned along one direction, a perfect orientation. Such a perfectly oriented structure has not been produced even with the highly oriented pyrolytic graphite that was produced by subjecting pyrolytic graphite concurrently to an ultra-high temperature (3,400° C.) under an ultra-high pressure (300 Kg/cm$^2$). The highly oriented graphene structure can achieve such a highest degree of perfection with a significantly lower temperature and an ambient (or slightly higher compression) pressure. The structure thus obtained exhibits an in-plane thermal conductivity from 1,500 up to slightly >1,700 W/mK, and in-plane electrical conductivity to a range from 15,000 to 20,000 S/cm.

The presently invented highly oriented PAH-derived structure can be obtained by heat-treating the dried layer of aligned PAH molecules with a temperature program that covers at least the first regime (typically requiring 1-24 hours in this temperature range), more commonly covers the first two regimes (1-10 hours preferred), still more commonly the first three regimes (preferably 0.5-5 hours in Regime 3), and most commonly all the 4 regimes (Regime 4, for 0.5 to 2 hour, may be implemented to achieve the highest conductivity).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. The graphitic film having a $d_{002}$ higher than 0.3440 nm reflects the presence of oxygen-containing functional groups (such as —OH, >O, and —COOH on graphene-like plane surfaces) that act as a spacer to increase the inter-graphene spacing.

Another structural index that can be used to characterize the degree of ordering of the presently invented oriented PAH-derived graphitic film and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our oriented PAH-derived graphitic samples have a mosaic spread value in this range of 0.2-0.4 (if produced with a heat treatment temperature (HTT) no less than 2,500° C.). However, some values are in the range from 0.4-0.7 if the HTT is between 1,500° C. and 2,500° C., and in the range from 0.7-1.0 if the HTT is between 300° C. and 1,500° C.

The following examples serve to provide the best modes of practice for the presently disclosed process and should not be construed as limiting the scope of the process:

Example 1: Graphitic Films from Naphthalene and Chlorinated Naphthalene

Graphitic films were produced from heat treated, highly oriented naphthalene and chlorinated naphthalene (2,3,6,7-Tetrachloronaphthalene) molecules by executing the following procedure (as an example): (a) pouring a mass of chlorinated naphthalene (5 g), chiorophenylene (5 g), and 0.1 g of PdCl$_2$ catalyst into a stainless steel reactor (5 gallon size); (b) heating the reactor from 25° C. to 150° C. at a rate of 2 degrees per minute and subsequently maintaining the temperature at 150° C. for 4 hours to obtain suspension of larger polycyclic aromatic molecules; (c) ultrasonic-spraying the suspension onto a glass substrate surface and vaporizing the liquid component of the suspension to obtain a dried layer of highly oriented polycyclic aromatic molecules; (d) heat-treating these oriented molecules on glass surface at a temperature of 800° C. for 2 hours to obtain carbon films, which were then further supported by a graphite plate and heat-treated at 2,800° C. for 2 hours to obtain graphitic films.

Figure 3A:
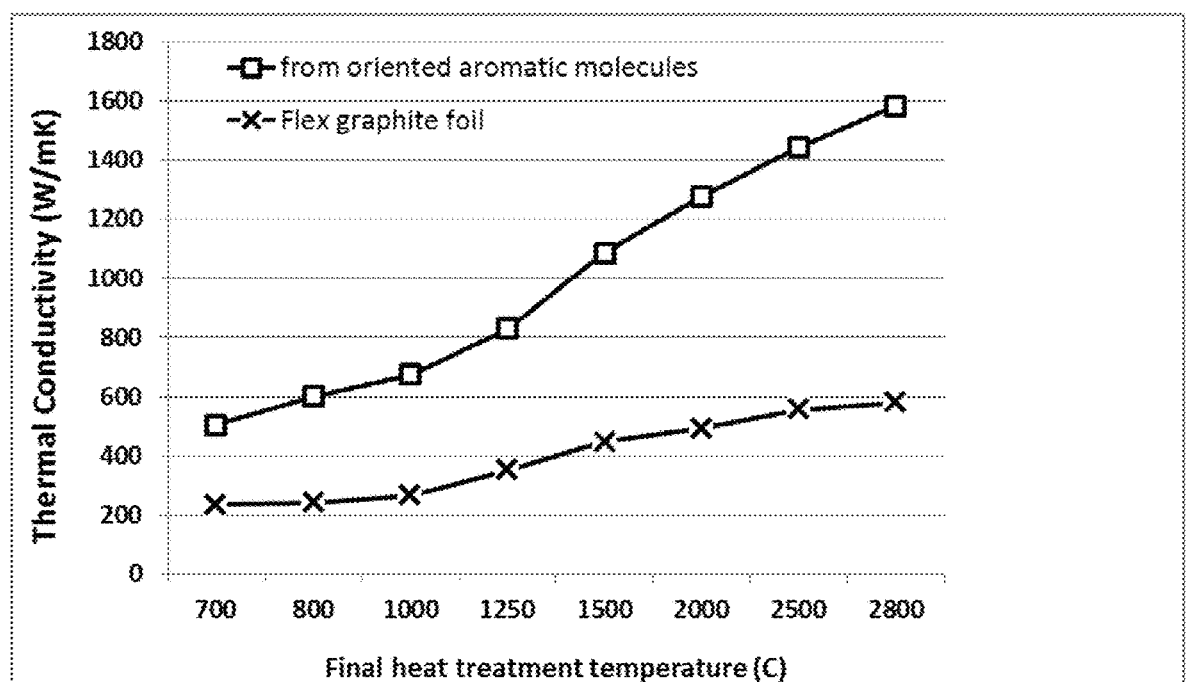
FIG. 3(A) Thermal conductivity of graphitic films and the baseline flexible graphite sheets plotted as a function of the final heat treatment temperatures of the oriented aromatic molecules.
Figure 3B:
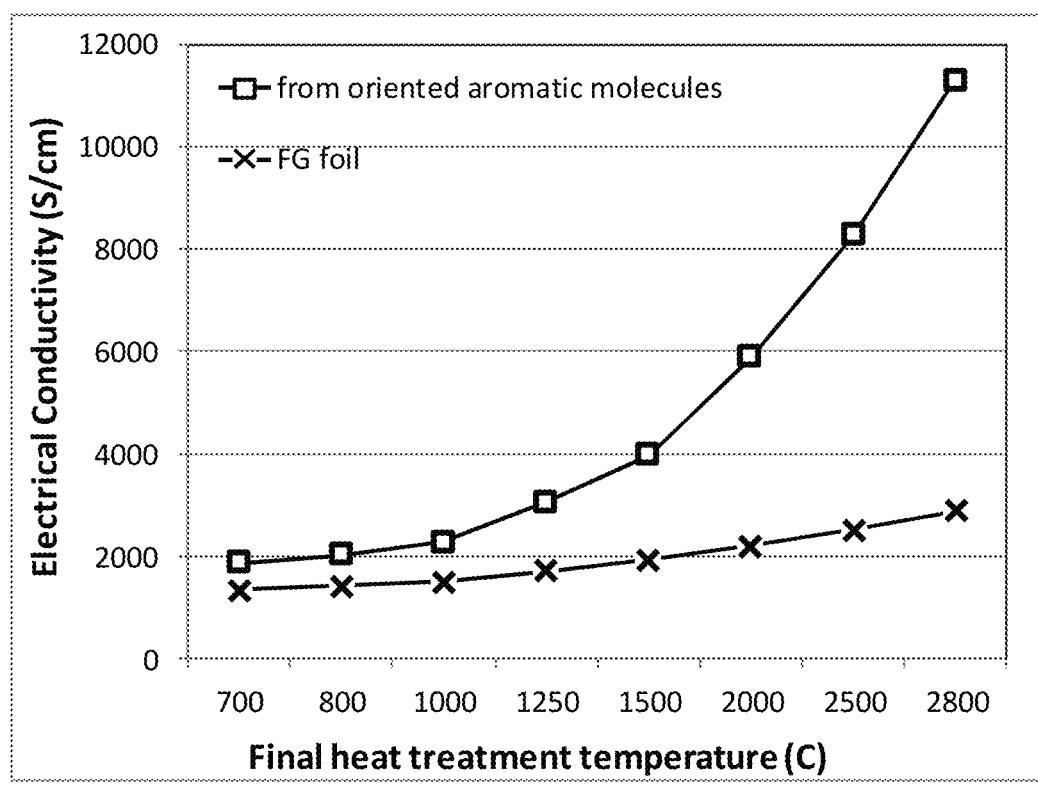
FIG. 3(B) Electrical conductivity of graphitic films and the baseline flexible graphite sheets plotted as a function of the final heat treatment temperatures of the oriented aromatic molecules.

Shown in FIG. 3(A) and FIG. 3(B) are the thermal conductivity and electrical conductivity values, respectively, of graphitic films and conventional flexible graphite sheets plotted as a function of the final heat treatment temperatures of the oriented aromatic molecules.

Example 2: Functionalized Carbon Films and Graphitic Films from Anthracene and Halogenated Anthracene A mass (10 grams) of anthracene and brominated anthracene, respectively, was added into a stainless steel reactor, which was heated from 25° C. to a temperature of 145° C. and subsequently maintained at the same temperature for 3 hours. On a separate basis for each starting material, 2'-chloro-1,1':4',1"-terphenyl was added into a stainless steel reactor, which was heated from 25° C. to a temperature of 145° C. and subsequently maintained at the same temperature for 12 hours in the presence of a catalyst, $PdCl_2$. Both procedures led to the formation of larger polycyclic hydrocarbons.

Subsequently, diethylenetriamine (DETA) was added separately into both reactors and the material mixture was processed at 350° C. for an additional 2 hours to obtain amine-functionalized aromatic carbon planes well dispersed in a disordered matrix of hydrocarbon molecules and solvent. Such a suspension was cooled down to below 100° C. and coated, using a slot-die coater, onto a roll of plastic sheet (PET film). The coated material was dried and separated from the plastic film. The dried, highly oriented functionalized aromatic molecules were subjected to a heat treatment temperature at 1,500° C. for 2 hours to obtain graphitic films.

In separate experiments, the following functional group-containing species were separately introduced to the aromatic mass being heat-treated at up to 350° C.: an amino acid, sulfonate group (—$SO_3H$), 2-Azidoethanol, polyamide (caprolactam), and aldehydic group. In general, these functional groups were found to promote or facilitate edge-to-edge chemical merging and some edge-to-plane linking between aromatic molecules that grow into highly graphitic structure having large graphite single crystals that are highly oriented. The final heat treatment temperature was typically from 1,200° C. to 3,200° C.

Example 3: Graphitic Films from Other Oriented Polycyclic Aromatic Hydrocarbon Molecules Various PAHs were used as a starting material for producing graphitic films through the presently disclosed method. The representative processing conditions are summarized in Table 1 below:

TABLE 1

Representative processing conditions and some salient features of products (Cl—means chlorinated; Br—means brominated; F—means fluorinated.

| Sample ID | Aromatic molecules | 1$^{st}$ heat treatment and catalyst (if any) | 2$^{nd}$ heat treatment | Coating/ aligning method |
|---|---|---|---|---|
| Ph-1 | Chlorinated Phenanthrene | 150° C. 2 h (PdCl$_2$) + 300° C. 3 h | 600° C., 3 h | Ultrasonic spraying |
| Ph-2 | Phenanthrene | 150° C. 2 h (PdCl$_2$) + 300° C. 3 h | 1,500° C. | Comma coating |
| Ph-3 | Chlorinated Phenanthrene | 150° C. 2 h + 300° C. 3 h | 2,800° C., 3 h | Ultrasonic spraying |
| Tc-1 | Tetracene | 125° C. 2 h (FeCl$_3$) + 300° C. 3 h | 900° C., 3 h | Slot-die coating |
| Tc-2 | Br-Tetracene | 125° C. 2 h + 300° C. 3 h | 2900° C. 1 h | Slot-die coating |
| Py-1 | Pyrene | 150° C. 5 h (PdCl$_2$) + functionalization | 1500° C., 3 h | Ultrasonic spraying |
| Py-2 | Cl-Pyrene | 150° C. 3 h (PdCl$_2$) | 900° C., 3 h | Ultrasonic spraying |

TABLE 1-continued

Representative processing conditions and some salient features of products (Cl—means chlorinated; Br—means brominated; F—means fluorinated.

| Sample ID | Aromatic molecules | 1$^{st}$ heat treatment and catalyst (if any) | 2$^{nd}$ heat treatment | Coating/ aligning method |
|---|---|---|---|---|
| Cn-1 | Coronene | 350° C. 3 h | 1500° C. 2 h | Comma coating |
| Cn-2 | Cl-Coronene | 350° C. 3 h | 1500° C. 2 h | |
| PP-1 | Petroleum pitch | 300° C. 2 h + 1500° C. 2 h | 2500° C. 1 h | Comma coating |
| PP-2 | Br-Petroleum pitch | 300° C. 2 h | 1250° C. 3 h | Ultrasonic spraying |
| CP-1 | Coal tar pitch | 350° C. 2 h (FeCl$_3$) | 900° C. 3 h | Comma coating |
| CP-2 | Cl-Coal tar pitch | 950° C. 2 h (FeCl$_3$) | None | Comma coating |
| CP-3 | Coal tar pitch | 1200° C. 2 h | None | Ultrasonic spraying |
| Tp + An-1 | Cl-triphenylene + F-anthracene | 300° C. 2 h | 1,500° C. 2 h | Slot-die coating |
| Tp − An-2 | Cr-triphenylene + F-anthracene | 300° C. 2 h | 2850° C. 2 h | Slot-die coating |

These data indicate that, upon completion of the first heat treatment, the longer/wider aromatic molecules can be further increased in length and width if the material is subjected to a second heat treatment at a higher temperature. Halogenation, along with some catalyst, can promote ring-fusing of polycyclic aromatic molecules to form larger aromatic molecules that are essentially incipient graphene molecules.

All the PAHs herein investigated (e.g. halogenated and un-halogenated versions of naphthalene, anthracene, phenanthrene, tetracene, chrysene, triphenylene, pyrene, pentacene, benzo-pyrene, corannulene, benzo-perylene, coronene, ovalene, and benzo-fluorene) can be methylated, aminated (derivatized with amine), hydroxylated, etc. to obtain derivatives having a substituent on a ring structure thereof. All the derivatives of these PAHs can be used as a starting material for practicing instant disclosed process to produce graphitic films.

As an example of the derivative of a PAH, chemical oxidation of anthracene occurs readily in the presence of, for example, hydrogen peroxide and vanadyl acetylacetonate, giving anthraquinone, $C_{14}H_8O_2$, shown below:

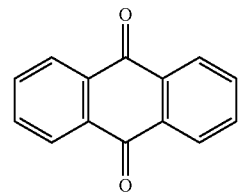 [SMILES: O=C1c2ccccc2C(=O)c2ccccc21]

These two O atoms are highly active and can readily react with a broad array of chemical species, such as those selected from —$SO_3H$, —COOH, —$NH_2$, —OH, —R'CHOH, —CHO, —CN, —COCl, halide, —COSH, —SH, —COOR', —SR', —SiR'$_3$, Si(—OR'—)$_y$R'$_{3-y}$, Si(—O—SiR'$_2$—)OR', R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate. Essentially, all the derivatives of PAHs can be used as a starting material for the production of graphitic films using the presently disclosed method.

The presently disclosed method is simple, fast, cost-effective, and generally does not make use of undesirable chemicals.

The invention claimed is:
1. A method of producing a graphitic film having a thickness from 2 nm to 1,000 μm, said method consisting of:
A) providing a suspension of aromatic molecules dispersed or dissolved in a liquid medium, wherein said aromatic molecules are selected from petroleum heavy oil or pitch, coal tar pitch, a polynuclear hydrocarbon, a halogenated variant thereof, or a combination thereof and wherein said aromatic molecules, containing a plane of hexagonal carbon atoms or fused aromatic rings, have an initial length or width from 5 nm to 1 μm;
B) dispensing and depositing said suspension onto a surface of a supporting substrate to form a wet layer of aromatic molecules, wherein said dispensing and depositing procedure includes subjecting said suspension to an orientation-inducing stress or strain;
C) partially or completely removing said liquid medium from the wet layer to form a dried layer of aromatic molecules; and
D) heat treating said dried layer of aromatic molecules at a first temperature selected from 25° C. to 3,000° C. so that said aromatic molecules are merged or fused into larger aromatic molecules, larger than said initial length or width, to form said graphitic film having graphene domains or graphite crystals, wherein said larger aromatic molecules or graphene planes in said graphene domains or graphite crystals are substantially parallel to each other.

2. The method of claim 1, wherein said liquid medium comprises a disordered matrix of carbon or hydrocarbon molecules.

3. The method of claim 1, wherein said polynuclear hydrocarbon is selected from naphthalene, anthracene, phenanthrene, tetracene, chrysene, triphenylene, pyrene, pentacene, benzo-pyrene, corannulene, benzo-perylene, coronene, ovalene, benzo-fluorene, a derivative thereof having a substituent on a ring structure thereof, a chemical derivative thereof, or a combination thereof.

4. The method of claim 1, wherein said graphene domains or graphite crystals have a length or width from 10 nm to 10 μm or an inter-graphene spacing from 0.34 nm to 2.2 nm.

5. The method of claim 1, wherein said aromatic molecules in step (A) are chemically functionalized with a functional group selected from —OH, —COOH, —NH₂, —C═O, or a combination thereof.

6. The method of claim 1, wherein said aromatic molecules in step (A) are attached with a chemical functional group selected from alkyl or aryl silane, alkyl or aralkyl group, hydroxyl group, carboxyl group, amine group, sulfonate group (—SO₃H), aldehydic group, quinoidal, fluorocarbon, or a combination thereof.

7. The method of claim 1, wherein said aromatic molecules in step (A) are attached with a chemical functional group, which is an azide compound selected from the group consisting of 2-azidoethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

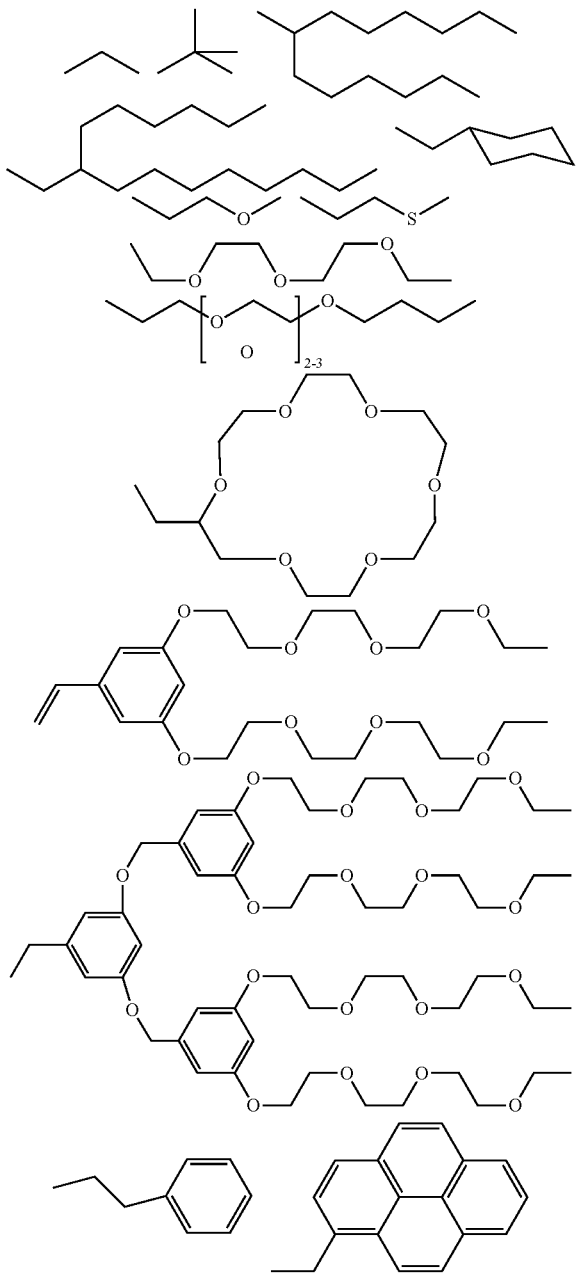

and combinations thereof.

8. The method of claim 1, wherein said aromatic molecules in step (A) are attached with a chemical functional group containing an oxygenated group selected from the hydroxyl, peroxide, ether, keto, aldehyde, or a combination thereof.

9. The method of claim 1, wherein said aromatic molecules in step (A) are attached with a chemical functional group selected from SO₃H, COOH, NH₂, OH, R'CHOH, CHO, CN, COCl, halide, COSH, SH, COOR', SR', SiR'₃, Si(—OR'—)$_y$R'$_{3-y}$, Si(—O—SiR'₂—)OR', R", Li, AlR'₂, Hg—X, TlZ₂ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, or a combination thereof.

10. The method of claim 1, wherein said aromatic molecules in step (A) are attached with a chemical functional group selected from amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, an acrylonitrile chain, polyfurfuryl alcohol, phenolic resin, or a combination thereof; and/or said functional group is selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R'', R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

11. The method of claim 1, wherein said suspension in step (A) further comprises a catalyst that contains a transition metal selected from Ti, V, Cr, Mn, Fe, Co, Ni, Cu, Zn, Zr, Nb, Mo, Ru, Pd, Ag, Cd, Pt, Au, a combination thereof, or wherein said catalyst contains a chemical species selected from PdCl$_2$, FeCl$_3$, FeBr$_3$, FeF$_3$, NiBr$_2$, NiI$_2$, Cs$_2$CO$_3$, CsF, CsCl, CsBr, CH$_2$CL$_2$, or a combination thereof.

12. The method of claim 1, wherein said step (d) of heat treating said dried layer of aromatic molecules is conducted while a compressive stress is imposed on said dried layer.

13. The method of claim 1, wherein said suspension contains said aromatic molecules in an amount sufficient to form a liquid crystal phase in said liquid medium.

14. The method of claim 1, wherein said liquid medium contains a non-aqueous solvent selected from polyethylene glycol, ethylene glycol, propylene glycol, an alcohol, a sugar alcohol, a polyglycerol, a glycol ether, an amine based solvent, an amide based solvent, an alkylene carbonate, an organic acid, or an inorganic acid.

15. The method of claim 1, wherein said graphitic film has a thickness from 10 nm to 200 μm.

16. The method of claim 1, wherein said steps (b), (c) and (d) are conducted in a roll-to-roll manner.

17. The method of claim 1, wherein said first heat treatment temperature contains a temperature in the range from 100° C.-1,500° C. and the graphitic film has an oxygen content less than 2.0%, an inter-planar spacing less than 0.35 nm, a physical density no less than 1.6 g/cm$^3$, a thermal conductivity of at least 800 W/mK, and/or an electrical conductivity no less than 2,500 S/cm.

18. The method of claim 1, wherein said first heat treatment temperature contains a temperature in the range from 1,500° C.-2,100° C. and the graphitic film has an oxygen content less than 1.0%, an inter-planar spacing less than 0.345 nm, a thermal conductivity of at least 1,000 W/mK, and/or an electrical conductivity no less than 5,000 S/cm.

19. The method of claim 1, wherein said first heat treatment temperature contains a temperature greater than 2,100° C. and the graphitic film has an oxygen content no greater than 0.1%, an inter-graphene spacing less than 0.340 nm, a mosaic spread value no greater than 0.7, a thermal conductivity of at least 1,300 W/mK, and/or an electrical conductivity no less than 8,000 S/cm.

20. The method of claim 1, wherein said first heat treatment temperature contains a temperature no less than 2,500° C. and the highly graphitic film has an inter-graphene spacing less than 0.336 nm, a mosaic spread value no greater than 0.4, a thermal conductivity greater than 1,600 W/mK, and/or an electrical conductivity greater than 10,000 S/cm.

21. The method of claim 1, wherein the graphitic film exhibits a degree of graphitization no less than 80% and/or a mosaic spread value less than 0.4.

\* \* \* \* \*